5467X
U. Emmons,
Wood Planing Machine.
Patented Apr 25, 1820.
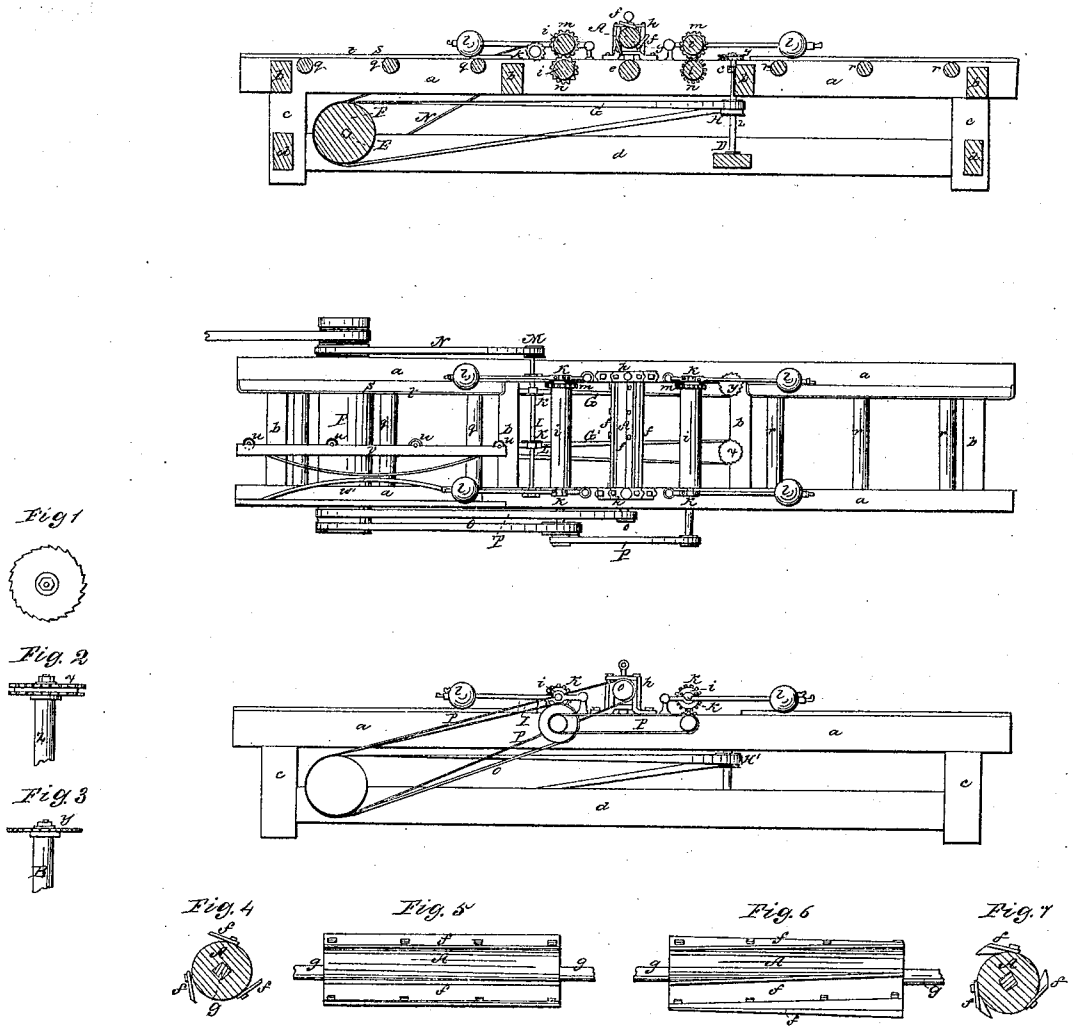
AM. PHOTO-LITHO. CO. N.Y. (OSBORNE'S PROCESS)

United States Patent Office

PTO - BOYERS, PA Duty Station

MISSING PAGE TEMPORARY NOTICE

PATENT # 5467X FOR ISSUE DATE 4-25-1829

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa